June 1, 1926.
E. J. TOREY
1,586,720
COMBINATION WATER BOTTLE, ICE BAG, AND SYRINGE
Filed Sept. 10, 1923
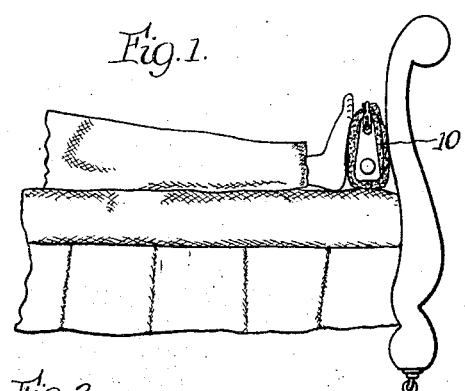
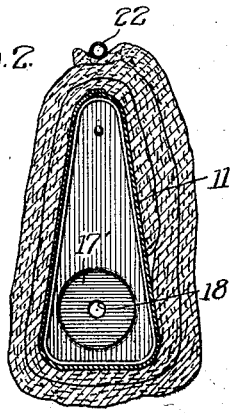
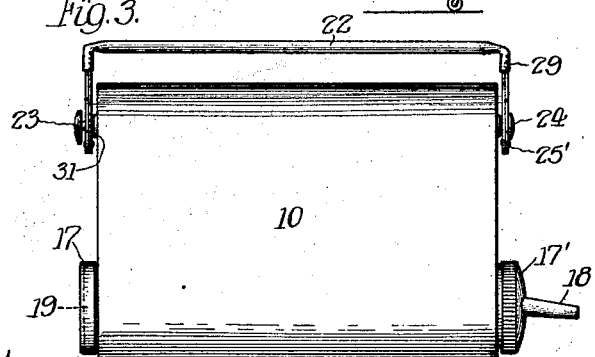
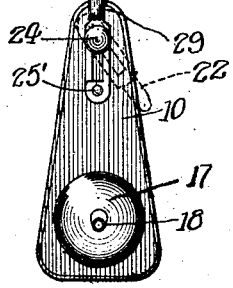
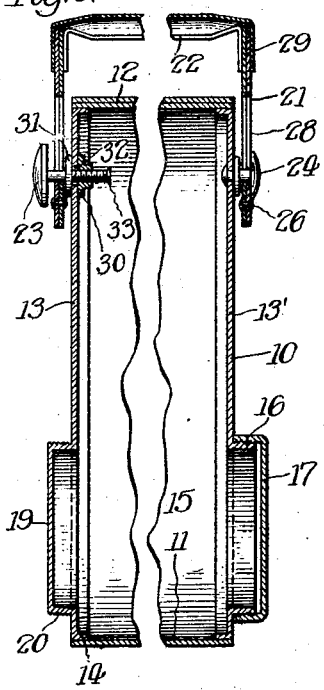
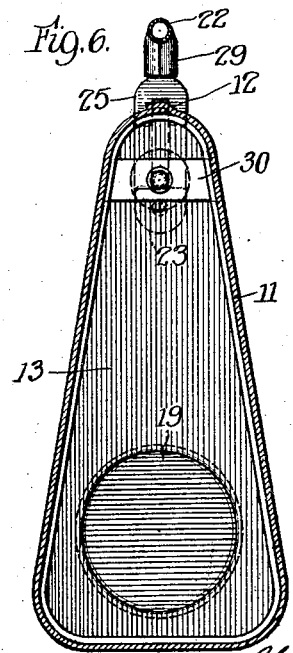
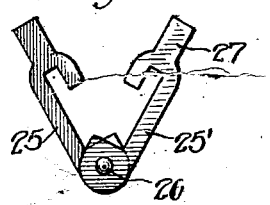
Inventor:
Edgar J. Torey,
By Chindahl, Parker & Carlson
Attys Patented June 1, 1926.

1,586,720

UNITED STATES PATENT OFFICE.

EDGAR J. TOREY, OF FREEPORT, ILLINOIS.

COMBINATION WATER BOTTLE, ICE BAG, AND SYRINGE.

Application filed September 10, 1923. Serial No. 662,016.

The invention pertains to an appliance adapted for use either as a hot water bottle, an ice bag or a fountain syringe, and my general aim has been to produce an appliance of this type which is of a thoroughly practical character and which may be manufactured economically.

A special object of the invention is to provide an appliance which is more durable than those now commonly in use, and to this end it is constructed of metal, which is capable of being repaired more easily than similar devices made of rubber, and which at the same time is inherently more durable.

A further object is to make the appliance of a shape such that it lends itself readily to the easy and convenient application thereof to the body, and also to the provision of a filling opening of sufficient size to receive particles of ice in order that the device may be used as an ice bag.

Still another object of the invention is to provide a combined bail or handle and towel clamp.

Another object is the provision of an air valve in combination with one of the anchoring devices for the bail.

The objects of the invention thus generally stated, together with other and ancillary advantages, are attained by the preferred construction and arrangement illustrated in the accompanying drawings. While I have herein shown but one form of the invention, it is contemplated that various changes may be made by those skilled in the art without departing from the spirit and scope of the invention as expressed in the appended claims.

Figure 1 of the drawings is a fragmentary side elevational view showing the appliance used as a hot water bottle, and illustrating an advantage in the shape of the device.

Fig. 2 is a vertical sectional view through the appliance illustrating the function of the bail as a towel clamp.

Fig. 3 is a side elevational view of the appliance.

Fig. 4 is an end view thereof.

Fig. 5 is a fragmentary vertical longitudinal sectional view.

Fig. 6 is a transverse sectional view.

Figs. 7 and 8 are detail views of one of the fastening devices for the bail.

The appliance comprises an elongated body 10 which is generally triangular in cross section, as shown clearly in Figs. 1, 2, 4 and 6. Preferably the body is made from relatively thin sheet metal and herein is shown as comprising a main or central portion 11 formed from a flat sheet of metal into the desired triangular shape, the edges of which are brought together at the upper end and suitably secured together as at 12. Fitted within the opposite ends of the main portion 11 are end pieces 13 and 13' preferably provided with inturned flanges 14 whereby the end pieces may be secured in position within the ends of the main portion 11 in any suitable way as by soldering, welding or the like.

A combined filling and discharge opening for water and ice is provided at 15. This opening is located near the bottom of the main body 10 in one end wall thereof. Herein the opening is provided in the end piece 13' which is constructed to provide a flange 16 at the edge of the opening. This flange extends outwardly and preferably is screw-threaded to receive a correspondingly threaded cap 17 or 17'. The former (Fig. 5) is adapted to close the opening when the appliance is used as a hot water bottle or ice bag, and the latter has formed rigid therewith a spout or nozzle 18 which is adapted to enter the end of a rubber hose or other flexible tube to permit the appliance to be used as a fountain syringe. When the cap 17 is not in use, or rather when it is desired to use the appliance as a syringe, the cap 17 is removed and placed over a boss 19, externally threaded at 20, and provided at the opposite end of the body on the end piece 13.

It will be observed that by reason of the shape of the body and by placing the opening near the lower portion thereof, the latter may be made of a size large enough to receive particles of ice, so that the appliance is readily adapted for use as an ice bag when desired.

The combination bail and towel clamp comprises a pair of fastening devices 21 and a hand portion 22; it is pivotally mounted upon the body 10 near the upper end thereof by means of headed studs 23 and 24 which are secured within the end pieces 13—13' of the body. These studs 23—24 are preferably secured in position in the end pieces 13—13' before such pieces are assembled into the main portion 11 of the body, and therefore I make the fastening devices 21 from two similar or complementary hook-like sections 25 and 25' pivoted together at their lower ends as at 26 (Fig. 7) and having upwardly extending portions 27 which when clamped together hold the two sections in such relation as to provide an elongated slot 28 therein adapted to receive the shanks of the studs 23—24. The extensions 27 are herein arranged to be entered within depending tubular portions 29 of the handle 22, and are secured therein in any suitable way so as to hold the sections of the fastening device together.

It will thus be seen that by the construction provided for the bail 21, a towel may be wrapped around the appliance as shown in Fig. 2, and the free end of the towel tucked under the hand portion 22 of the bail so as to be held thereby. When a towel is not used, the bail may be moved into the position shown in full lines in Fig. 4 with the hand portion in contact with the upper side of the body; or, the bail may be swung around to the side of the body (Fig. 4) with the handle portion in close contact therewith as permitted by the slots 28 and thus consume as little space as possible.

To provide a vent for admitting air to the interior of the body 10, when the appliance is used as a syringe, one of the studs 23—24 for pivotally supporting the bail 21 is constructed so as to be capable of functioning as an air valve. Herein the stud 23 is shown (Figs. 5 and 6) as screw-threaded into a plate 30 engaging at its opposite ends with the inner side walls of the body 10 as shown in Fig. 6 so as to be held against rotation. Upon the outer side of the body the shank of the stud has rigid therewith a collar 31 and the opening through which the shank passes is shown at 32 as being enlarged beyond the diameter of the stud. It will thus be understood that when the stud is screwed into the plate 30 to clamp the collar 31 tightly against the outer wall of the body, the opening 32 will be sealed, but that when the stud is unscrewed so as to loosen the collar with respect to the end wall of the body, air will be permitted to pass through the opening into the body. Preferably the screw-threaded end of the stud is headed or burred as at 33 so as to prevent its removal and detachment from the body.

It will be observed that I have provided a combination appliance of the character indicated which is advantageous because of its shape in that it lends itself readily to convenient application to the body, and further because this shape renders it possible to provide a filling opening of a size large enough to accommodate pieces of ice so that the appliance may be used as an ice bag as well as a water bottle and syringe. The dual function of the bail as a carrying means as well as a towel clamping device is also noted, as is the dual function of one of the studs for the bail as a means for fastening the bail and as an air valve to permit the use of the appliance as a syringe. A general advantage is that the appliance is constructed of metal so that it may be quickly and easily repaired, and the construction is relatively simple so that it may be manufactured at a low cost.

I claim as my invention:

1. A combination water bottle and syringe comprising an elongated water tight sheet metal body of substantially triangular cross section, one end wall of the body having in its portion of greatest width an opening of substantial size, a cap having a nozzle thereon adapted to be secured over said opening, an air valve located in the upper portion of the other end wall of the body and means to open or close said valve to control discharge through the nozzle, said valve being adapted to be closed when the device is used as a water bottle.

2. A water bottle comprising an elongated water tight sheet metal body of substantially triangular cross section, one end wall of the body having in its portion of greatest width a flanged opening of substantial size, a cap to close said opening and a bail adjacent the narrow end of the body and having a pivotal and sliding connection with the body, the parts being so proportioned that the cross member of the bail may be adjusted to relatively close relation to said narrow end, whereby a towel may be clamped between said cross member and said narrow end.

3. A combination appliance of the character indicated comprising an elongated body constructed of sheet metal and substantially triangular in cross section, an opening in one wall of the body in the portion of greatest width, a flange around said opening, a cap adapted to be secured to said flange and having a hose attaching nozzle thereon, a bail for the body, and means for fastening the bail to the body including a valve device operable to permit of the passage of air into the upper portion of the body or to close the body.

4. An appliance of the character indicated comprising an elongated body having its lower portion of substantial width and gradually decreasing in width toward its upper end, and a combined bail and towel clamp secured to the upper portion of the body.

5. An appliance of the character indicated comprising an elongated body having its lower portion of substantial width and gradually decreasing in width toward its upper end, a combined bail and towel clamp secured to the upper portion of the body and comprising a pair of studs secured in opposite end walls of the body, and fastening devices for the bail having elongated slots adapted to receive said studs.

6. An appliance of the character indicated comprising an elongated body having its lower portion of a substantial width and gradually decreasing in width toward its upper end, a combined bail and towel clamp secured to the upper portion of the body and comprising a pair of studs secured in opposite end walls of the body, and fastening devices for the bail having elongated slots adapted to receive said studs, said devices being made in two complementary hook-like sections pivoted together at one end and secured together at their opposite ends with said studs interposed between them.

7. A combination appliance of the character indicated comprising a body having a combined filling and discharge opening, and means providing an air valve to permit of the admission of air to the body comprising a screw-threaded stud, a member upon the inside of the body in which said stud is screw-threaded, said body having an opening therethrough of a diameter adapted loosely to receive the stud, and a collar rigid with the stud upon the outer side of the body arranged to be clamped over said opening.

8. A combination appliance of the character indicated comprising a body having a combined filling and discharge opening, and means providing an air valve to permit of the admission of air to the body comprising a screw-threaded stud, a member upon the inside of the body in which said stud is screw-threaded, said body having an opening therethrough of a diameter adapted loosely to receive the stud, a collar rigid with the stud upon the outer side of the body arranged to be clamped over said opening, and a bail for the body one end of which is secured upon said stud.

In testimony whereof, I have hereunto affixed my signature.

EDGAR J. TOREY.